United States Patent [19]

Lee

[11] Patent Number: 4,940,414
[45] Date of Patent: Jul. 10, 1990

[54] ANTITHEFT CAR AUDIO SET WITH REMOVABLE CONTROL BOX

[75] Inventor: Jong D. Lee, Kyungki-Do, Rep. of Korea

[73] Assignee: Namsung Electronics Corp., Rep. of Korea

[21] Appl. No.: 345,094

[22] Filed: Apr. 28, 1989

[30] Foreign Application Priority Data

Sep. 20, 1988 [KR] Rep. of Korea .......... 15432/1988[U]

[51] Int. Cl.$^5$ .................... H01R 13/627; H01R 13/44
[52] U.S. Cl. .................... 439/131; 439/159;
439/298; 439/310; 439/352; 455/349
[58] Field of Search ............... 455/346, 347, 348, 349;
439/131, 297, 298, 259, 310, 352, 928, 152–159

[56] References Cited

U.S. PATENT DOCUMENTS

| | | | |
|---|---|---|---|
| 3,917,372 | 11/1975 | Selinko | 439/259 |
| 4,481,512 | 11/1984 | Tscheulin | 455/346 |
| 4,578,739 | 3/1986 | McKee | 455/329 |

*Primary Examiner*—Neil Abrams
*Attorney, Agent, or Firm*—Ostrolenk, Faber, Gerb & Soffen

[57] ABSTRACT

A separable car audio set for antitheft includes a control box, a face plate, a frame and a contact block assembly between the face plate and the frame. The face plate has a concave well in and from which the control box is easily received and separated. When it is desired top protect the audio set from theft during parking the control box will be easily removed from the concave well of the face plate without separating the whole audio set from a vehicle.

7 Claims, 8 Drawing Sheets

ANTITHEFT CAR AUDIO SET WITH REMOVABLE CONTROL BOX

The present invention relates to a separating apparatus for a control box of a car audio set, and more particularly to an antitheft car audio set in which a control box mounted on a face plate of a car audio set is separable from a face plate of the car audio set.

BACKGROUND OF THE INVENTION

Various apparatus are used for antitheft of a car audio set, one of which is known as a "pull out type". The "pull out type" car audio set is receivable in and detachable from the car audio hole as a whole. This "pull out type" car audio set has disadvantages in breaking the electrical contact between the car audio set and the battery in a vehicle and storing the separated car audio set as a whole.

SUMMARY OF THE INVENTION

It is, therefore, a primary object of the present invention to provide a fabricated car audio set wherein an easily separable control box only is detached from a face plate of a car audio set for preventing theft of a car audio set.

Another object of the present invention is to provide an improved car audio set assembly in which contact pins positioned in the main body of the audio set and connected to the contact members in the control box are not exposed to the outside of the face plate and subsequently not damaged, when separated Accordingly, during parking the car audio set will not be stolen by separating the control box from the face plate of the car audio set without removing the car audio set as a whole from a vehicle.

The car audio set of the present invention comprises a separable control box and a face plate from which the control box is easily separable. The control box has contact members therein and a circuit board which are connected to each other and the main body of the car audio set has contact pins which are connected to the contact members in the control box, the contact pins not being exposed to the outside of the face plate in separated condition.

BRIEF DESCRIPTION OF THE DRAWINGS

These objects and advantages of the invention will become apparent from the following detailed description of a preferred embodiment thereof, in connection with the accompanying drawings in which like numerals designate like elements, and in which.

DETAILED DESCRIPTION OF THE INVENTION

Figure 1:
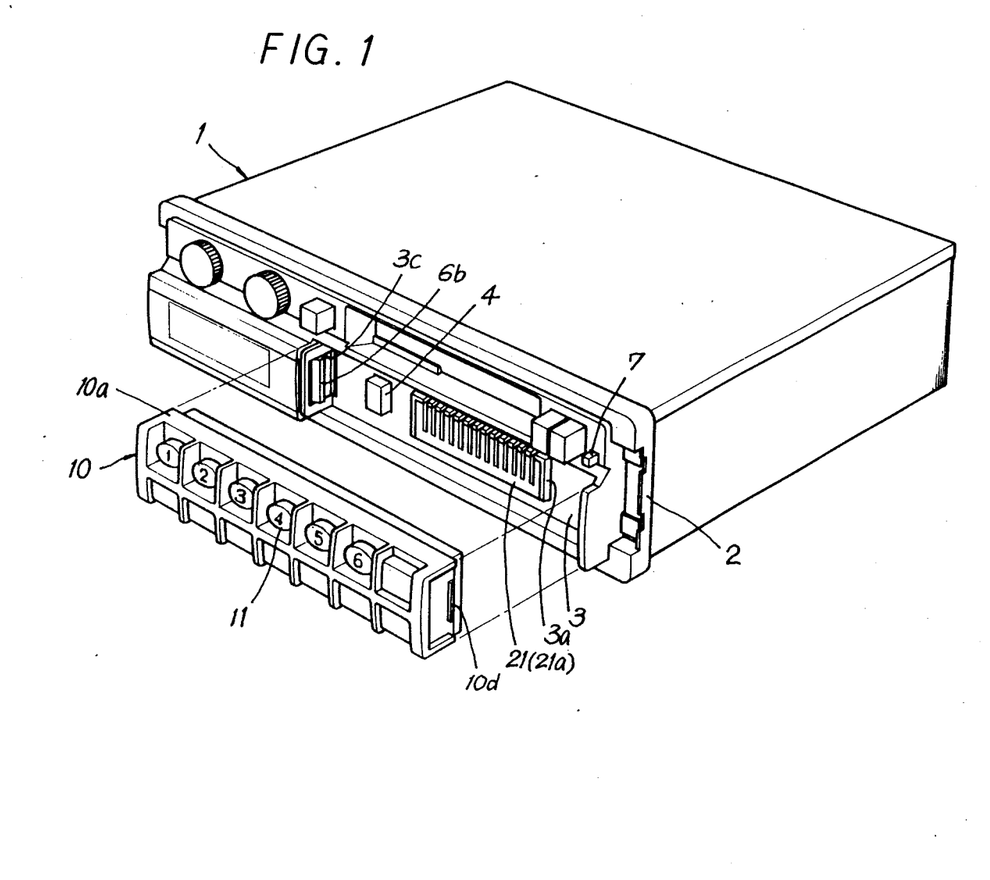
FIG. 1 is a perspective view of a car audio set of the present invention, wherein the control box is separated from the face plate of the car audio set.
Figure 2:
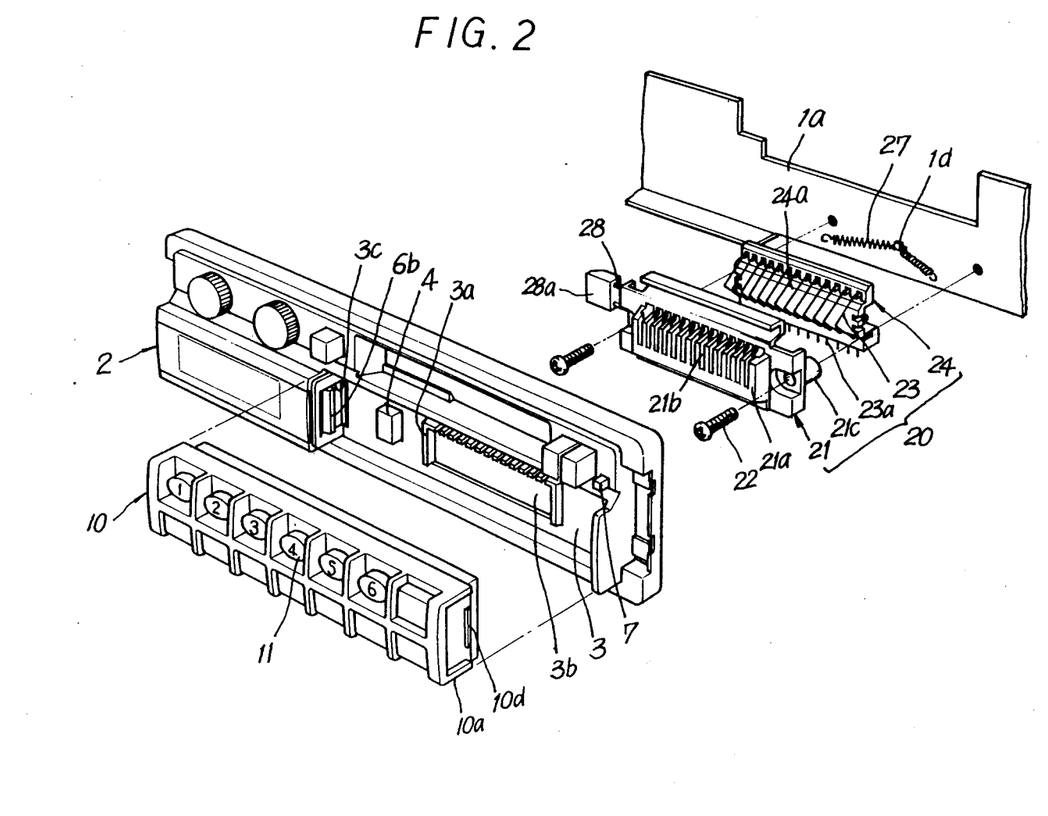
FIG. 2 is an exploded perspective view of the car audio set of the present invention, the view showing the whole construction of the car audio set.

Referring to FIGS. 1 and 2, a car audio set constructed in accordance with the present invention consists of a housing body 1, a control box 10 and a contact block assembly 20. The control box 10 is receivable in a concave well 3 formed in a face plate 2. The control box 10 is engagable with or disengagable from the concave well 3. The contact block assembly 20 is positioned between the rear face of the face plate 2 and a frame member 1a for electrical connection between the control box 10 and a circuit board 1c which is provided within the housing body 1 (FIG. 4).

Figure 3A:
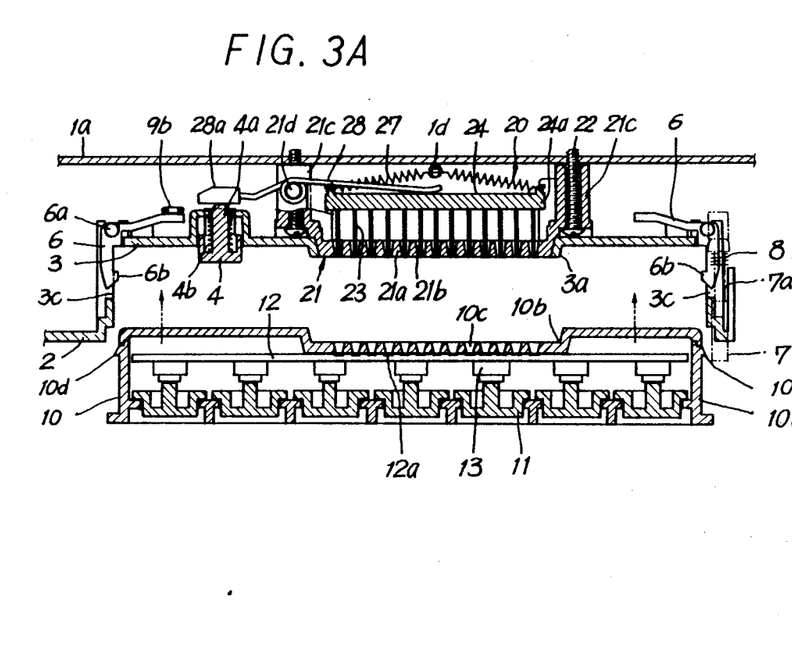
FIG. 3A is a sectional view of the car audio set of the present invention, wherein the control box is separated from the face plate of the car audio set.
Figure 3B:
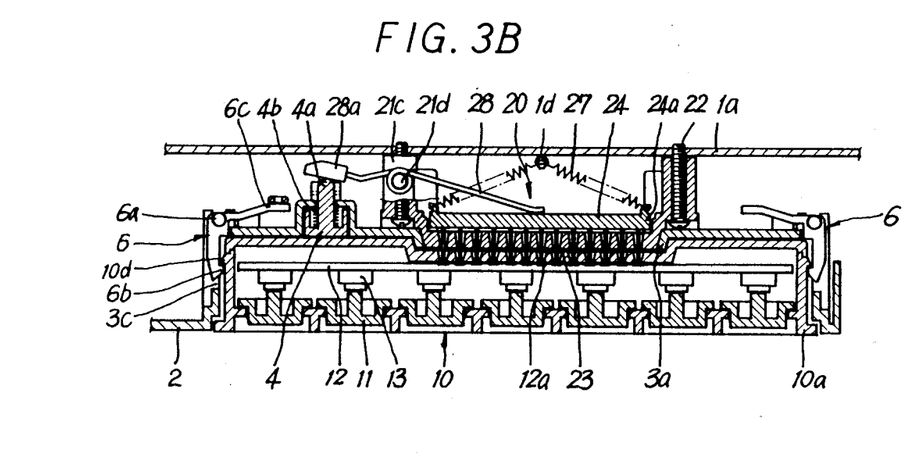
FIG. 3B is a view similar to FIG. 3A, this view showing the control box assembled to the face plate of the car audio set.
Figure 3C:
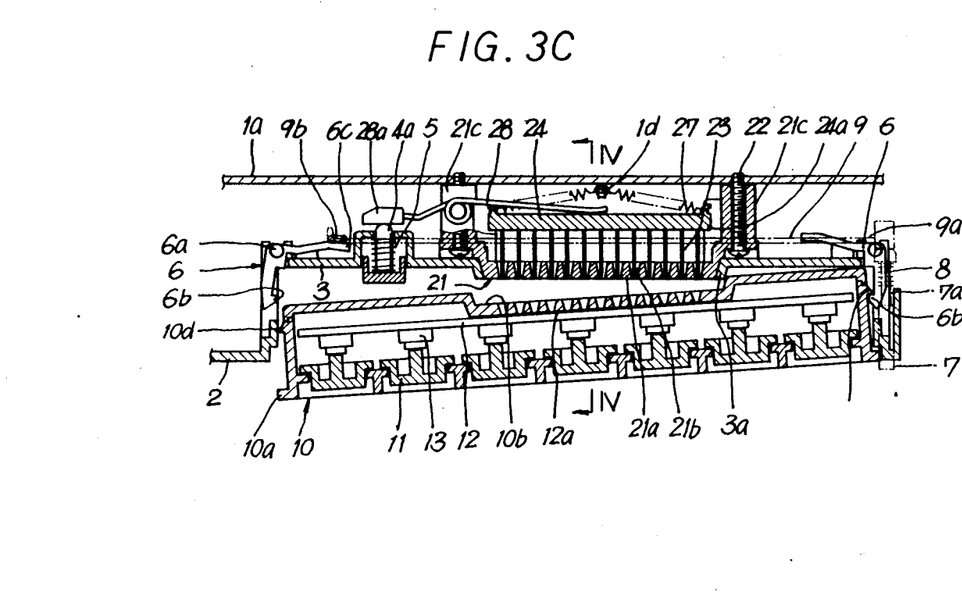
FIG. 3C is a view similar to FIG. 3A, this view showing the process of the separation of the control box from the car audio set.
Figure 4:
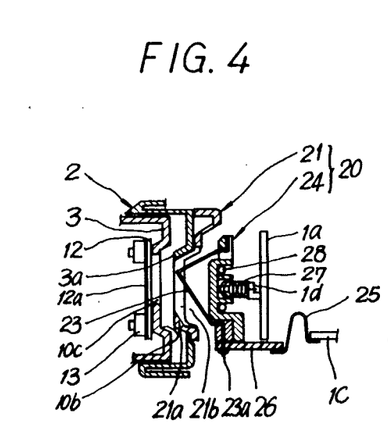
FIG. 4 is a sectional view taken along the line IV—IV of FIG. 3C.

As shown in FIGS. 3 and 4, the control box 10 comprises an elongated housing 10a. The elongated housing 10a has laterally spaced push button knobs 11 in the face plate thereof. A circuit board 12 internally housed within the housing 10a has laterally spaced push switches 13 actuated by the push button knobs 11. A recess 10b is provided in the housing 10a at the rear center face. In the recess 10b and at the rear face of the circuit board 12 are a plurality of contact members 12a and longitudinal openings 10c which are positioned alternatively. Outwardly side extensions 10d are provided in the rear region of the side walls of the housing 10a.

An elongated slot 3b is provided in the mid-region of the concave well 3 of the face plate 2. The elongated slot 3b has curved frames 3a which are fitted in the recess 10b.

On one side of the slot 3b and through the face plate is a push button 4 that has an actuator member 4a resiliently supported by a spring 4b. On each side wall of the concave well 3 is provided a slot 3c through which an extension 6b of a latch pawl 6 engages the extension 10d of the housing 10a. The latch pawl 6 is resiliently supported by a panel spring 5 and is pivoted by the pivot portion 6a. The lower portion 6c of the latch pawl 6 is spaced from the rear face of the face plate 2.

Figure 5:
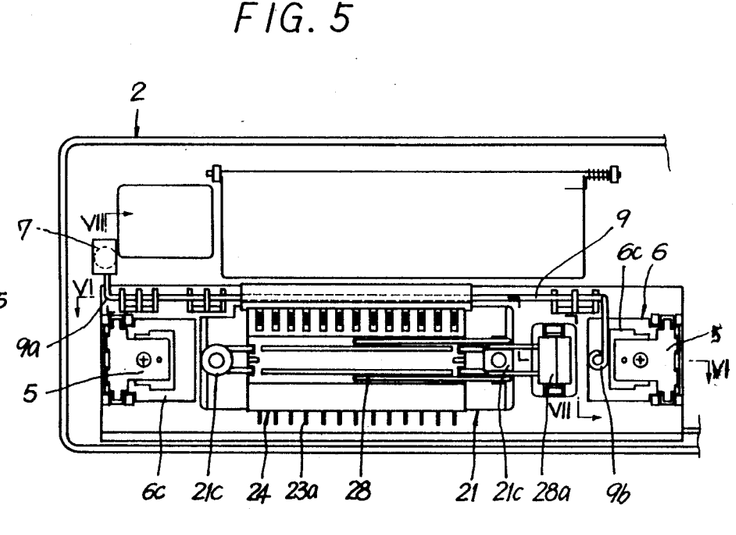
FIG. 5 is a partial rear view of the face plate of the car audio set of the present invention, this view showing the contact block and the control box assembled by means of a lever.
Figure 6:
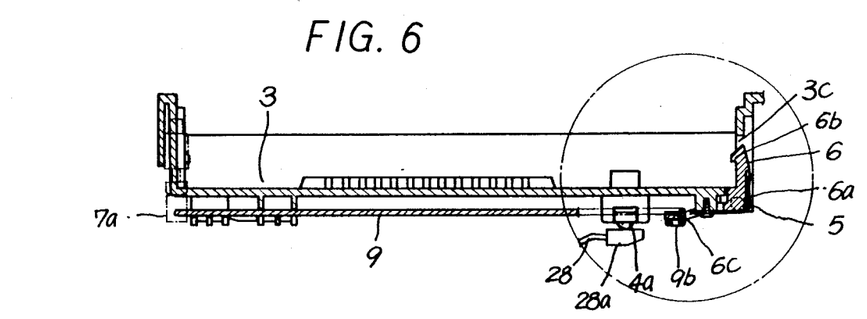
FIG. 6 is a sectional view taken along the line VI—VI of FIG. 5.
Figure 7:
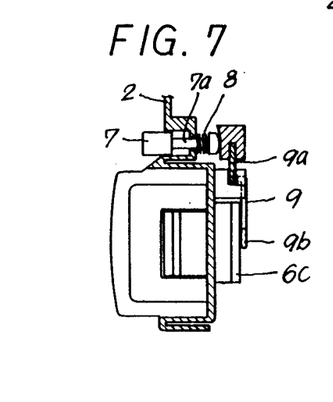
FIG. 7 is a sectional view taken along the line VII—VII of FIG. 5.

On the right side of the concave well 3 and through the face plate 2 is provided another push button 7 having an actuator member 7a resiliently surrounded by a spring 8. As shown in FIG. 5, the rear end portion of the actuator member 7a contacts with one arm 9a of a lever 9 which has two opposite-directed arms 9a and 9b. The other end arm 9b of the lever 9 contacts with the lower portion 6c of the latch pawl 6. By this arrangement as the push button 7 is pushed, the lower portion 6c of the latch pawl 6 will be pushed forward, thereby removing the extension 6b from the slot 3c.

The contact block assembly 20 provided between the face plate 2 and the frame 1a of the housing body 1 comprises a contact block frame 21 and a contact block 24. The contact block frame 21 has a forwardly protruding portion 21a having a number of longitudinal slots 21b corresponding to the slots 10c in the rear recess 10b of the control box 10. The contact block 24 comprises a forwardly protruding portion 24a on which a number of parallel spaced contact pins 23 are disposed. The protruding portion 24a of the contact block 24 is slidably received in the rear concave of the protruding portion 21a of the contact block frame 21 by receiving the contact pins 23 through the slots 21b. The contact block frame 21 has two opposite bosses 21c for receiving bolts 22. Upon bolting the contact block frame 21 and the frame 1a, the two frames 21 and 1a engage with each other.

As shown in FIG. 4 the lower end 23a of the contact pins 23 passes downwardly through the contact block 24 to be connected to a connector 26 at the one end of a flexible wire 25 which is connected to the circuit board 1c. To both sides of the rear face of the contact block 24 are connected the two ends of a tension spring 27. The mid-portion of the tension spring 27 is hanging by a hook member 1d provided on the frame 1a, thereby biasing the contact block 24 rearwardly.

A lever 28 is hinged on one of the bosses 21c by a shaft pin 21d One end of the lever 28 contacts the mid-portion of the rear face of the assembled contact block 24, while the other end of the lever 28 defining a contact member 28a contacts the actuator member 4a of the push button 4.

Hereinafter the operation and effect of the present invention will be described in detail.

In FIG. 3 the control box 10 is detached from the housing body 1 of the audio set. In this condition the contact block 24 is strained rearwardly by the force of the tension spring 27 thus maintaining a space between the contact block 24 and the frame 21. Therefore, the forwardly protruding point of the contact pins 23 is positioned behind the slots 21b and the one end of the lever 28 contacting the rear face of the contact block 24 is in the anti-clockwise direction about the shaft pin 21d causing the contact member 28a to push the actuator member 4a subsequently causing the push button 4 to protrude forwardly of the face plate 2. In this arrangement the contact pins 23 will not be exposed to the outside of the face plate 2 and not be damaged by the force exerted from the outside.

To operate the audio set, the control box 10 is slidably received in the concave well 3 of the face plate 2. As shown in FIG. 3B the extensions 10d of the control box housing 10a engage the extensions 6b of the latch pawl 6 thus preventing the detachment of the control box 10. In this condition the rear face of the control box 10 will push the forwardly extruding push button 4 causing the actuator member 4a to push the contact member 28a rearwardly and subsequently to rotate the other end of the lever 28 clockwise.

According to the above operation of the lever 28 the contact block 24 which has been strained rearwardly will move forwardly, causing the forwardly projected point of the contact pins 23 to be exposed forwardly and subsequently to be passed through the longitudinal slots 10c. Subsequently, the pins 23 will contact the contact member 12, causing the electrical contact to be accomplished between the push switches 13 on the control box 10 and the circuit board 1c internally housed in the housing body 1.

In this condition, the one side of the rear face of the control box 10 is in contact condition to the push button 4 which has been retreated from the face plate 2.

And both the restoring force of the spring 4b under pressure and the force of the tension spring 27 are exerted on the push button 4. Therefore, the contact block 24 is biased forwardly by the push button 4.

Figure 8A:
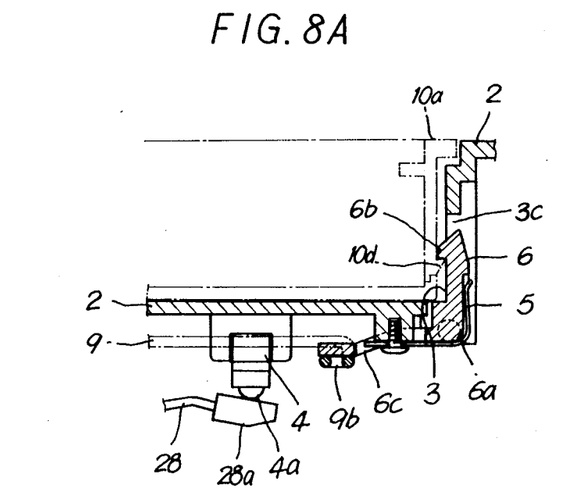
FIG. 8A and FIG. 8B are enlarged views of the encircled portion of FIG. 6, these views showing the process of separation of the control box
Figure 8B:
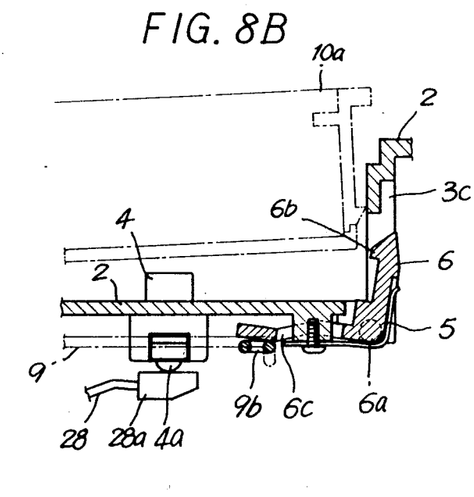

When it is desired to detach the control box 10 from the housing body 1, as shown in FIG. 3C, the push button 7 is pushed, thereby disengaging the extensions 10d of the control box 10 from the latch pawl 6. Depression of the push button 7 with the actuator member 7a depresses the one end 9a of the lever 9. Subsequently, the other end 9b of the lever 9 will depress the lower portion 6c of the latch pawl 6. Therefore, as shown in FIG. 8B, the extension 6b of the latch pawl 6 will be removed from the slot 3c, thus disengaging the extension 6b from the extension 10d of the control box 10.

At this moment, however, by the restoring force of the push button 4 the one side of the control box 10 will be pushed forwardly from the concave well 3, while the other side of the control box 10 will remain in engaging condition, thus preventing unexpected sudden falling and damaging of the control box 10.

When it is desired to remove the control box 10 completely from the face plate 2, the forwardly detached portion of the control box 10 will be caught and pulled by the user's hand. And then, the other end of the control box 10 in latched position will be completely removed from the housing body 1.

The foregoing detailed description has been given for clearness of understanding only, and no necessary limitations should be understood therefrom, as some modifications will be obvious to those skilled in the art.

What is claimed is:

1. A separating apparatus for a control box of a car audio set, comprising: a housing body, a face plate having a concave well, a main frame having a tension spring hanging on the inner wall thereof, a contact block assembly positioned between said face plate and said frame, and a control box which is separable from said face plate, said control box being receivable in and detachable from said concave well of said face plate, said control box comprising a housing having a number of longitudinal slots on the rear face thereof, a plurality of switches and a circuit board connected to said switches, said circuit board having a number of contact members which are engageable through said longitudinal slots, said concave well of said face plate having a longitudinal slot, said contact block assembly comprising a contact block and a contact block frame, said contact block having a plurality of contact pins provided forwardly thereof, said contact block frame having a forwardly protruding portion having a number of longitudinal slots communicating with said longitudinal slots of said control box for receiving said contact pins of said contact block and two opposite bosses through which said main frame and said contact block frame are connected, said tension spring being provided between said main frame and said contact block for biasing said contact block toward the inner wall of said main frame, said contact pins, when moved forward against the bias of the tension spring, contacting said contact members of said circuit board.

2. An apparatus according to claim 1, wherein the contact block frame further comprises a lever with a contact member, the rear face of the contact block contacting one end of the lever, and wherein the concave well of the face plate has a push button with an actuator member therethrough, said contact member of said lever being contacted by said actuator member.

3. An apparatus according to claim 1, wherein the concave well of the face plate has two latch pawls with hook shaped portions on both outside walls thereof and the control box housing has two opposite extensions with which said hook shaped portions are to be engaged, one of said latch pawls being contacted by a lever, and the face plate has another push button therethrough for actuating said lever.

4. An apparatus to claim 1, wherein said tension spring is provided between said main frame and opposite rear sides of said contact block.

5. An apparatus according to claim 4, wherein said main frame and said contact block frame are connected through said bosses by bolts.

6. An apparatus according to claim 5, wherein said switches include push button switches.

7. An apparatus according to claim 6, wherein said contact pins include curved contact pins.

* * * * *